United States Patent [19]

Lafuze

[11] 4,218,732
[45] Aug. 19, 1980

[54] PHASE ANGLE BALANCING CIRCUIT FOR A VARIABLE SPEED CONSTANT FREQUENCY POWER SYSTEM

[75] Inventor: David L. Lafuze, Endicott, N.Y.
[73] Assignee: General Electric Company, Wilmington, Mass.
[21] Appl. No.: 957,909
[22] Filed: Nov. 6, 1978
[51] Int. Cl.² .......................................... H02M 5/257
[52] U.S. Cl. .................................. 363/160; 290/38 R
[58] Field of Search ................. 290/38 R, 46; 322/25, 322/29; 328/14; 363/160-162

[56] References Cited

U.S. PATENT DOCUMENTS

| | | | |
|---|---|---|---|
| 3,152,297 | 10/1964 | Peaslee | 363/162 |
| 3,289,070 | 11/1966 | Caldwell et al. | 307/106 |
| 3,873,928 | 3/1975 | Lafuze | 328/14 |
| 3,902,073 | 8/1975 | Lafuze | 290/46 |
| 3,908,130 | 9/1975 | Lafuze | 290/38 X |
| 3,937,974 | 2/1976 | Lafuze | 290/38 R X |
| 4,044,296 | 8/1977 | Dhyanchand et al. | 322/25 |

Primary Examiner—William M. Shoop
Attorney, Agent, or Firm—David Blumenfeld

[57] ABSTRACT

A phase angle balancing circuit for a variable speed constant frequency (VSCF) power system is disclosed. Multiphase electric power signals from cycloconverters are summed to produce continuously and automatically the zero sequence voltage of the multiphase electric power signals. The zero sequence voltage signal is provided to each of the modulator stages associated with the cycloconverters to effect phase angle correction of the phase relationships between the multiphase electric power signals. A bandpass filter, having a passband center frequency centered on the preselected frequency of the multiphase electric power signals, is added to the phase angle balancing circuit of the present invention to make the zero sequence voltage corrective means stable as a well damped negative feedback system. The bandpass filter also eliminates undesirable frequency harmonics and "hash" on the signal having the zero sequence voltage caused by undesired frequency components in the multiphase electric power signal system. In addition, another bandpass filter can be added having its frequency centered on the n harmonic (where n is the number of phases in the multiphase electric power system) for producing an n harmonic sequence voltage, which is also applied to each of the modulator stages. This additional path reduces the n harmonic distortion in the power system voltage waveform.

17 Claims, 4 Drawing Figures

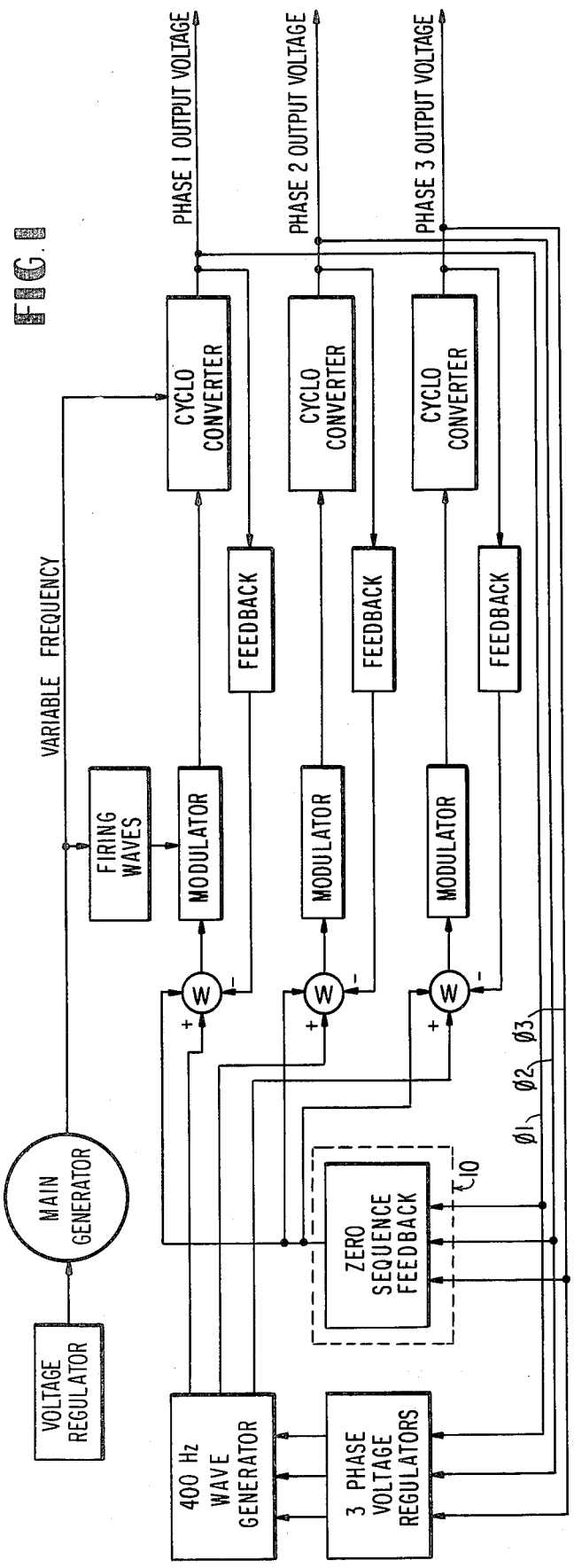
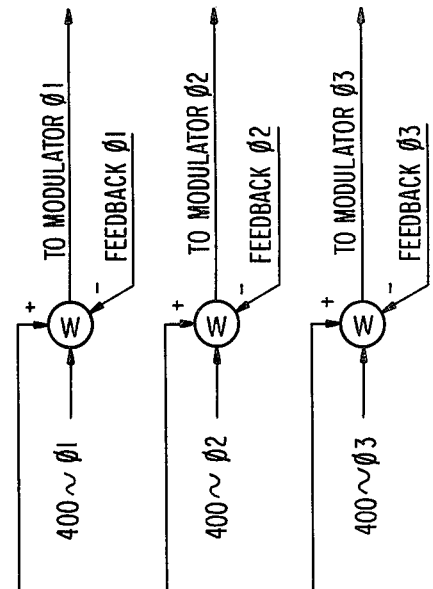
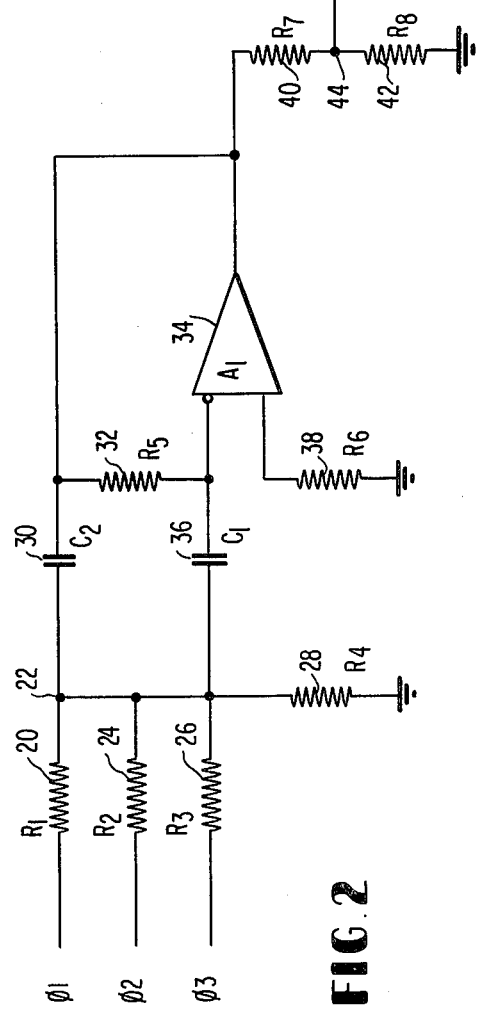
FIG. 1
FIG. 2

PHASE ANGLE BALANCING CIRCUIT FOR A VARIABLE SPEED CONSTANT FREQUENCY POWER SYSTEM

BACKGROUND OF THE INVENTION

1. Field of the Invention

The present invention relates generally to phase angle balancing circuits for multiphase electric power systems, and more particularly, to a phase angle balancing circuit for a variable speed constant frequency (VSCF) power system where the zero sequence voltage of the multiphase electric power signals from the cycloconverters is produced continuously and automatically to effect phase angle balancing between the multiphase electric power signals. The present invention is specifically directed to a phase angle balancing circuit for a VSCF multiphase electric power system used in an aircraft environment.

2. Description of the Prior Art

Phase angle balancing has been a problem which has existed in multiphase VSCF electric power systems from their inception. Phase angle balancing is required by the users of these generators, who require it for equipment which is phase error sensitive. The phase angle imbalance in such multiphase VSCF electric power system is caused by changing system loads and component value variations of the components in the multiphase electric power generation system itself.

In the area of variable speed constant frequency (VSCF) multiphase electric power generation systems, which are used extensively in aircraft applications, the problems which result from improper phase angle relationships between the multiphase electric power signals becomes acute due to the problems which result in the performace of the electronically sophisticated loads connected to the VSCF power system.

In conventional VSCF systems, feedback circuits from the output of each cycloconverter and its associated modulator circuit together with individual voltage amplitude and frequency reference signals allow the voltage amplitude levels of the multiphase electric power signals to be kept automatically and continuously within specified limits. However, when the loads connected to the VSCF system power signals become imbalanced, or when the component values of the components used in the VSCF system deviate from the preselected values, a phase angle imbalance between the multiphase electric power signals occurs. Such phase angle imbalances are uncorrectable in conventional VSCF systems.

While it has been impossible as a practical matter to prevent phase angle imbalance caused by varying loads in conventional VSCF power systems, many attempts for improving the phase angle balancing of the multiphase electric power signals when the loads are constant and balanced have been made by keeping the tolerances of the components in the conventional VSCF system within tight limits. Such tight tolerances of component parameters, however, result in substantial increases in fabrication, operation and maintenance costs, and, thus, should be eliminated, if possible. Representative of conventional VSCF power systems and subsystems which do not exhibit continuous and automatic phase angle balancing are the following references:

| | | |
|---|---|---|
| Re. 26,630 | Peaslee | Issued 7/15/69 |
| 3,152,297 | Peaslee | Issued 10/6/64 |
| 3,289,070 | Caldwell et al | Issued 11/29/66 |
| 3,400,321 | LaFuze | Issued 9/3/68 |
| 3,419,785 | LaFuze | Issued 12/31/68 |
| 3,593,106 | LaFuze | Issued 7/13/71 |
| 3,609,509 | LaFuze | Issued 9/28/71 |
| 3,641,418 | Plette | Issued 2/8/72 |
| 3,745,471 | LaFuze | Issued 7/10/73 |
| 3,873,928 | LaFuze | Issued 3/25/75 |
| 3,902,073 | LaFuze | Issued 8/26/75 |
| 3,908,161 | Messenger | Issued 9/23/75 |

An excellent generalized discussion of conventional VSCF power systems is found in *Aircraft Electric Power Seminar—Technical Proceedings,* General Electric Company, Aircraft Equipment Division, Binghamton, N.Y., May 10–11, 1977.

U.S. Pat. No. 4,044,296 to Dhyanchand et al, issued Aug. 23, 1977, discloses an electronic voltage regulator for three-phase generators. Dhyanchand et al is only of interest with respect to the present invention for its teaching of sensing the average of the three-phase voltages. The purpose, function, and structure of the Dhyanchand et al system, however, are entirely different from those of the present invention. Specifically, in Dhyanchand et al, the purpose of the system is to provide electronic circuits for regulating the voltage and for limiting the current output of the three-phase generators, whereas the purpose of the phase angle balancing circuit for a VSCF system of the present invention is to maintain continuously and automatically the phase relationship between the multiphase electric power signals. The function of the Dhyanchand et al system is to provide electronic voltage regulation by sensing the average of the phase voltages, the highest phase voltage and the highest phase current, and by comparing the error signal with a triangular wave to provide a signal to control an output amplifier circuit and ultimately the exciter field current of the generator. In comparison, the zero sequence voltage signal produced by the phase angle balancing circuit for a VSCF power system of the present invention is applied having a polarity to produce negative feedback to each of the modulators associated with the respective cycloconverters. Examination of the circuit diagrams in Dhyanchand et al and the present invention shows that they are entirely different.

BRIEF DESCRIPTION OF THE DRAWINGS

FIG. 1 is an electrical block diagram of a conventional VSCF power system showing the addition of the zero sequence feedback stage of the phase angle balancing circuit of the present invention.

FIG. 2 is an electrical schematic diagram of one embodiment of the zero sequence feedback stage of the phase angle balancing circuit of the present invention having an active filter with a passband centered on the preselected frequency of the multiphase electric power signals produced by the cycloconverters.

SUMMARY OF THE INVENTION

Figure 3A:
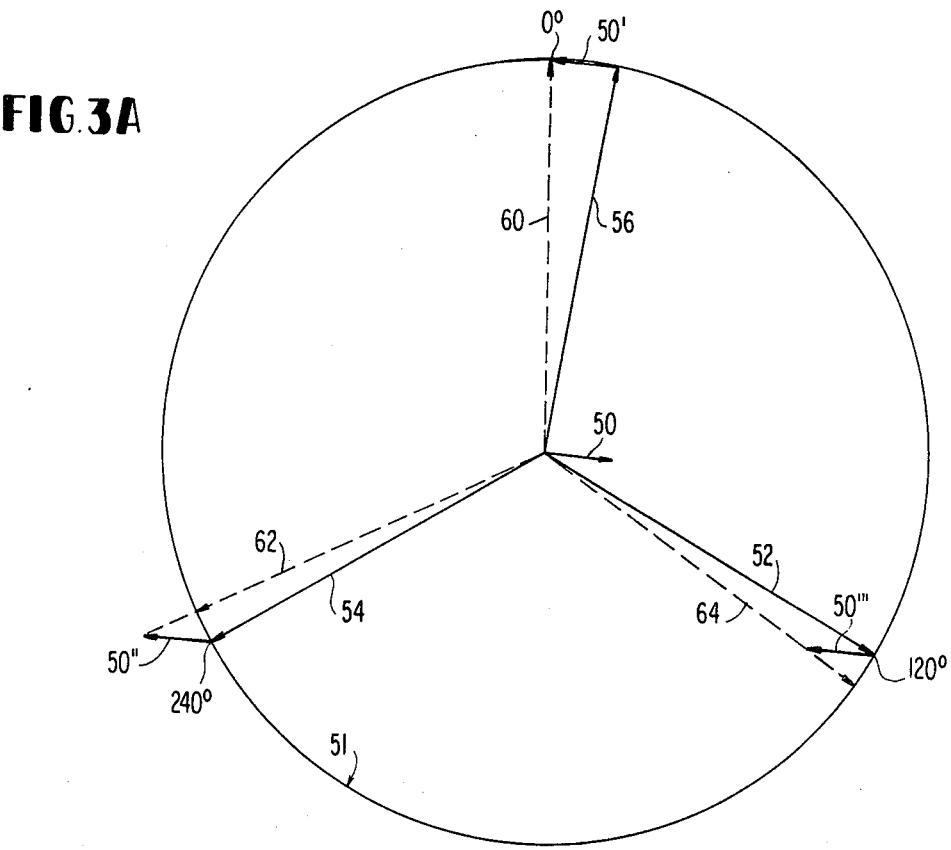
FIG. 3A is a phasor diagram of a three-phase VSCF power system plotting as solid line phasors the actual phase relationship between the multiphase electric power signals, the zero sequence voltage signal and the resultant phase angle correction produced thereby, and plotting as dash line phasors the resultant phase angle correction of the phase relationship between the multiphase electric power signals after a first iterration of the negative feedback analog signal provided by the phase angle balancing circuit of the present invention.

The present invention is a phase angle balancing circuit for a variable speed constant frequency (VSCF) power system which automatically and continuously produces an improved phase angle relationship between the multiphase electric power signals produced by the cycloconverters of the VSCF system. The phase angle balancing circuit of the present invention sums the multiphase electric power signals from the cycloconverters to produce a zero sequence voltage signal, which is applied to effect negative feedback to each of the modulator stages associated with the respective cycloconverters. The feedback of the zero sequence voltage signal results in improved phase angle balancing between the multiphase electric power signals. A bandpass filter having a center frequency centered on the preselected frequency of the multiphase electric power signals is included in the phase angle balancing circuit of the present invention to establish the dynamic characteristics of the feedback loop.

In a first embodiment, the multiphase electric power signals are summed at a first junction after having been passed through a voltage divider resistor network. The first junction is connected to the input of an active filter having a passband whose center frequency is centered on the preselected frequency of the multiphase electric power signals. The output signal of the active filter is applied by a voltage divider to each of the modulators associated with the respective cycloconverters of the VSCF power system. A bandpass filter having a center frequency centered on the n harmonic (where n is the number of phases of the multiphase electric power signal) can also be added to the phase angle balancing circuit of the present invention to provide an n harmonic sequence voltage signal which is also provided with a polarity to produce negative feedback to each of the modulators. The zero sequence and n harmonic sequence voltages produced by the phase angle balancing circuit of the present invention produce continuous and automatic improved phase angle balancing between the multiphase electric power signals produced by the VSCF power system.

DETAILED DESCRIPTION OF THE INVENTION

In its basic form, the phase angle balancing circuit of the present invention sums the multiphase electric power signals from the cycloconverters of a conventional variable speed constant frequency (VSCF) power system to produce automatically and continuously a zero sequence voltage signal. The zero sequence voltage signal having a polarity to produce negative feedback is applied to each of the modulators associated with the respective cycloconverters in the VSCF system. The zero sequence voltage signal produces an improved phase angle balancing of the multiphase electric power signals, as is discussed in greater detail below. It should be understood that the phase angle balancing circuit of the present invention can be used in a VSCF power system having two or more phases.

Referring now to FIG. 1, a zero sequence feedback stage of the phase angle balancing circuit of the present invention designated generally by the reference numeral 10, has been added to a conventional VSCF three-phase power system. Such a conventional three-phase VSCF power system is described in detail in the references noted above, and the teachings of these references are incorporated by reference into this specification.

As shown in FIG. 1, the phase 1, phase 2 and phase 3 electric power signals provided by the three cycloconverters, respectively, are applied to the zero sequence feedback stage 10. The zero sequence feedback stage 10, in its basic form, sums the phase 1, 2 and 3 electric power signals so as to produce a zero sequence voltage signal. The zero sequence voltage signal is then applied with a proper polarity to effect negative feedback to the three summers associated with each of the respective three modulators of the conventional three-phase VSCF power system. By feeding back the zero sequence voltage signal in a manner to produce negative feedback, the phase angle balancing circuit of the present invention produces improved phase angle balancing between phase 1, 2 and 3 electric power signals.

The bandpass filter makes the corrective loop stable as a negative feedback system, as well as rejecting unwanted harmonics and "hash". The response of a bandpass filter to modulation of a signal at its center frequency is the same as the response of a simple RC filter to the modulating signal, i.e., the envelope of the center frequency. Thus, when a step of voltage at the center frequency is applied to a bandpass filter, the envelope of the filter output builds up in a simple time constant function. This time constant is proportional to the Q of the filter so the higher the Q the slower the response.

If a load change results in a step change in zero sequence voltage, the corrective action is not completed instantaneously. Such an instantaneous change would probably cause a miscommutation. A gradual correction of a well damped regulating loop, however, eliminates the danger of miscommutation. The permissible gain of the correcting loop is proportional to the Q of the filter.

It should be noted that the addition of the bandpass filter to the phase angle balancing circuit of the present invention does not adversely affect the wave shape output protection capability or the other feedback functions found in conventional VSCF multiphase power systems.

An embodiment of the phase angle balancing circuit of the present invention for use in a three-phase VSCF system is shown in FIG. 2. The embodiment shown in FIG. 2 also includes an active filter having a passband with a center frequency centered on the preselected frequency of the phase 1, 2 and 3 electric power signals. A resistor 20 connects the phase 1 power signal to a node 22, while a resistor 24 connects the phase 2 electric power signal to node 22 and a resistor 26 connects the phase 3 electric power signal to node 22. A resistor 28 is connected between node 22 and electrical ground. As is apparent to those skilled in the art, resistors 20, 24 and 26 form a voltage divider network with resistor 28. Resistors 20, 24 and 26 are selected to have a high resistance value while resistor 28 is selected to have a low resistance value, causing the summed voltage at node 22 to have an amplitude level substantially below that of the amplitude levels of phase 1, 2 and 3 electric power signals. When there are no undesired harmonic frequency components or "hash" present on the phase 1, 2 and 3 electric power signals, the voltage at node 22 is the zero sequence voltage signal. The part of the signal at node 22 which is at the power system frequency is the zero sequence voltage scaled by the divider network.

An active filter is included in the embodiment of the phase angle balancing circuit of the present invention shown in FIG. 2. A first lead of a capacitor 30 is connected to node 22, while the second lead is connected to the first lead of a resistor 32 and to an output terminal of an operational amplifier 34. The first lead of a capacitor 36 is connected to node 22 and the second lead is connected to the second lead of resistor 32 and also to a first inverted input of operational amplifier 34. A second noninverting input of operational amplifier 34 is connected via a resistor 38 to electrical ground. Capacitors 30, 36, resistors 32, 38 and capacitors 30, 36, resistors 32, 38 and operational amplifier 34 constitute the active bandpass filter. The component values of these five components are selected to produce a passband having a center frequency centered on the preselected frequency of the electrical power signals. Thus, the active bandpass filter removes the undesired frequency components from the zero sequence voltage signal present at node 22 and produces at the output of operational amplifier 34 a zero sequence voltage signal substantially free of the undesired frequency components.

The amplitude level of the zero sequence voltage signal present at the output of operational amplifier 34 is adjusted in a voltage divider network made up of a resistor 40 and a resistor 42 connected in series between the output of operational amplifier 34 and electrical ground. The adjusted zero sequence voltage signal present at node 44 at the connection of resistors 40 and 42 is applied to each of the three summers associated with the respective three modulators of the three phase VSCF power system, as shown in FIGS. 1 and 2. It should be noted that the polarity of the zero sequence voltage signal must be so as to produce negative feedback. As shown in FIG. 2, the zero sequence voltage signal present at node 44 is applied to a negative input for each of the three summers, and, thus, the required inversion of the zero sequence voltage signal to produce negative feedback is produced by the summers. It should be realized, however, that the inversion of the zero sequence voltage signals can be done at the summer or can be done in the phase angle balancing circuit of the present invention.

It should be noted that the active bandpass filter of the embodiment shown in FIG. 2 may be replaced by any other type of bandpass filter which would produce the desired response. Thus, other active bandpass filter circuits can be employed as well as passive bandpass filters of known design.

Table 1 shown below gives representative component values for the embodiment of the phase angle balancing circuit shown in FIG. 2 applied to a three-phase 400 Hz. VSCF system.

Table 1

| Component Name & Number | Component Value |
| --- | --- |
| Resistor 20 | 100KΩ |
| Resistor 24 | 100KΩ |
| Resistor 26 | 100KΩ |
| Resistor 28 | 200Ω |
| Capacitor 30 | .1μf |
| Capacitor 36 | .1μf |
| Resistor 32 | 80.4KΩ |
| Operational Amplifier 34 | LM-148 (Natl. Semiconductors of California) |
| Resistor 38 | 80.6KΩ |
| Resistor 40 | 150KΩ |
| Resistor 42 | 3.24KΩ |

The embodiment of the phase angle balancing circuit shown in FIG. 2 can be constructed using discreet components. It can also be constructed using hybrid integrated circuit fabrication techniques. As is well-known in the art, hybrid fabrication integrated circuit techniques allow active filters to be constructed which exhibit constant passband response over large variations in supply voltage and operating temperature. Thus, for many applications, hybrid integrated circuit fabrication techniques are a preferred form for the phase angle balancing circuit of the present invention.

The actual operation of the phase angle balancing circuit of the present invention is now described with reference to FIGS. 3A and 3B. It should be understood that the fedback zero sequence voltage signal provided by the phase angle balancing circuit to the modulators is an analog signal and is not a digital feedback signal. However, for purposes of explanation, the analog zero sequence voltage signal can be viewed as being made up of an infinite number of phase angle balancing interrations which occur each time a phase angle imbalance occurs.

FIG. 3A is a phasor diagram of a three-phase VSCF system plotting the first iterration of the feedback of the zero sequence voltage signal after a phase angle imbalance occurs. In this connection, it should be understood that the zero sequence voltage signal has a zero value when there is no phase angle imbalance between the multiphase electric power signals. Circle 51 of FIG. 3A indicates the voltage amplitude level at which each of the phase 1, 2 and 3 electric power signals is maintained by the three-phase voltage regulators found in the conventional VSCF power generation system. Solid line phasor 52 plots the phase 1 power signal, solid line phasor 56 plots the phase 2 power signal, and solid line phasor 54 plots the phase 3 power signal. Solid line phasors 52, 56 and 54 indicate the phase imbalance which exists in the hypothetical example prior to the first iterration of the feedback of the zero sequence voltage signal: solid line phasor 56 is imbalanced with respect to solid line phasors 52 and 54, as shown by the 0° reference point at the top of circle 51.

Because of the phase imbalance of solid line phasor 52 and phasor 54, a first iterration zero sequence voltage signal having a relatively high voltage amplitude level, as plotted by a solid line phasor 50, is provided so as to produce negative feedback by the phase angle balancing circuit 10 of the present invention to each of the modulators. The negative feedback of the first iterration zero sequence voltage signal is vectorally plotted by the three phasors 50', 50" and 50''' associated with phasors 56, 54 and 52 respectively. As shown by FIG. 3A, the phasor 56 and phasor 50' produce a dash line phasor 60, having a phasor position which is at the desired 0° point on circle 51 and having a voltage amplitude level which is equal to the desired level plotted by circle 51. In contrast, the phasor sum of phasor 54 and phasor 50″ produces a dash line phasor 62, having a phasor position which is displaced clockwise from the desired 240° point on circle 51 and having a voltage amplitude level which is greater than the desired level plotted by circle 51. As indicated, the three phase voltage regulators of the conventional VSCF system decreases the voltage amplitude level of the dash line phasor 62 back to the desired level plotted by circle 51. Similarly, the phasor sum of phasor 52 and phasor 50‴ produces a dash line phasor 64, having a phasor position which is displaced clockwise from the desired 120° point on circle 51 and having a voltage amplitude level which is less than the desired level plotted by circle 51. As indicated, the three phase voltage regulators of the conventional VSCF system increases the voltage amplitude level of dash line phasor 64 up to the desired level plotted by circle 51. As is now apparent, the fedback first iterration zero sequence voltage signal causes the phase imbalance between the phase 1, 2 and 3 electric power signals to be reduced but not eliminated.

Figure 3B:
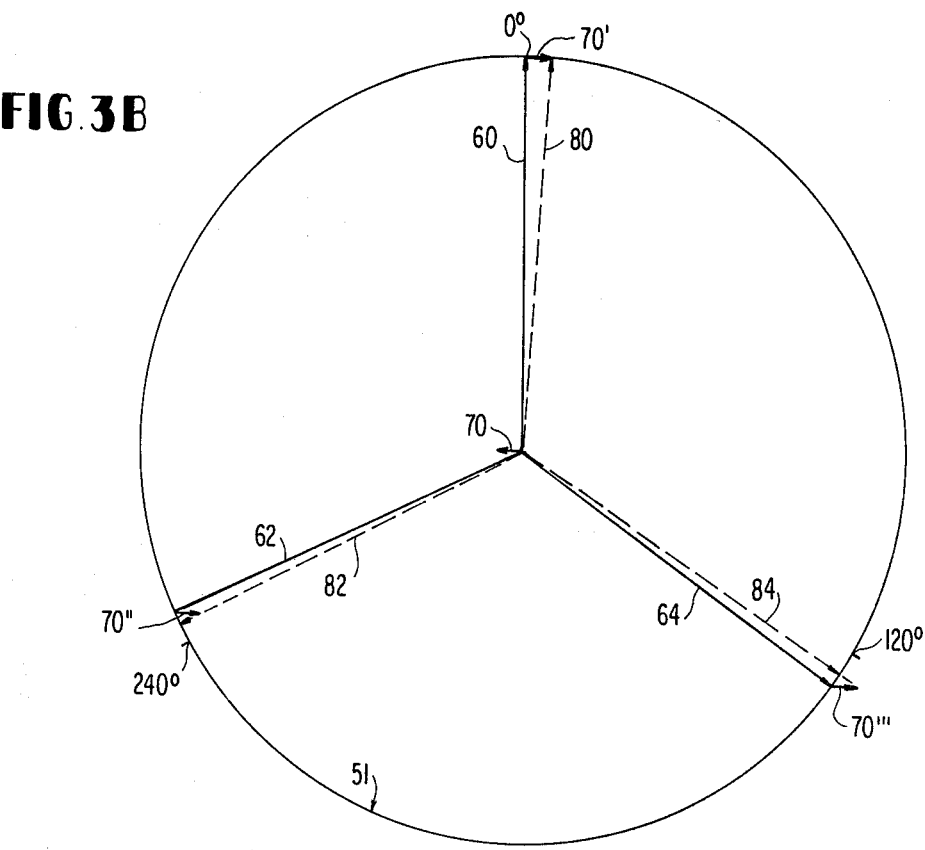
FIG. 3B is a phasor diagram of a three-phase VSCF power system plotting as solid line phasors the actual phase relationship between the multiphase electric power signals, the zero sequence voltage signal and the resultant phase angle correction produced thereby, and plotting as dash line phasors the resultant phase angle correction of the phase relationship between the multiphase electric power signals after a second iterration of the negative feedback analog signal provided by the phase angle balancing circuit of the present invention.

FIG. 3B is a phasor diagram of a three-phase VSCF system plotting the second iterration of the feedback of the zero sequence voltage signal due to the continuing phase imbalance after the feedback of the first iterration zero sequence voltage. Solid line phasors 60, 62, 64, of FIG. 3B, correspond respectively to dash line phasors 60, 62, 64 of FIG. 3A.

Because of the phase imbalance of solid line phasors 62 and 64 with respect to solid line phasor 60, a second interration zero sequence voltage signal having a relatively low voltage amplitude level, as plotted by a solid line phasor 70, is provided so as to produce negative feedback by the phase angle balancing circuit 10 of the present invention to each of the modulators. The negative feedback of the second iterration zero sequence voltage signal is vectorally plotted by the three phasors 70′, 70″ and 70‴ associated with phasors 60, 62, 64, respectively.

As shown by FIG. 3B, the phasor sum of phasor 60 and phasor 70′ produces a dash line phasor 80, having a phasor position which is displaced clockwise from the desired 0° point on circle 51 and having a voltage amplitude level that is substantially equal to the desired level plotted by circle 51. Similarly, the phasor sum of phasor 62 and phasor 70″ produces a dash line phasor 82, having a phasor position which is between phasor 62 and the desired 240° point on circle 51 and having a voltage amplitude level which is less than the desired level plotted by circle 51. As indicated, the three phase voltage regulators of the conventional VSCF system increases the voltage amplitude level of dash line phasor 82 up to the desired level plotted by circle 51. In like fashion, the phasor sum of phasor 64 and 70‴ produces a dash line phasor 84, having a phasor position which is between phasor 64 and the desired 120° point on circle 51 and having a voltage amplitude level which is greater than the desired level plotted by circle 51. As indicated, the three phase voltage regulators of the conventional VSCF system decreases the voltage amplitude level of the dash line phasor 84 back to the desired level plotted by circle 51. As is now apparent, the fedback second iterration zero sequence voltage signal causes the phase imbalance between phase 1, 2 and 3 electric power signals to be further reduced but not eliminated.

Each additional feedback iterration of the zero sequence voltage signal causes the phase imbalance between the phase 1, 2 and 3 electric power signals to be reduced further. However, while the phase angle balancing circuit 10 of the present invention produces a substantial reduction in phase imbalance with respect to conventional VSCF power generation systems, the phase imbalance is never entirely eliminated. It should be noted in this connection, however, that the phase angle balancing circuit 10 of the present invention can produce a reduction in the amplitude value of the zero sequence voltage signal to a level of less than 1 volt, which is substantially within aircraft application specifications.

It has been found that the desired loop voltage gain for the feedback circuit composed of the phase angle balancing circuit 10 and an associated modulator is in the range of 2 to 10 dB.

Adequate corrective action can usually be achieved with loop gain of 6 to 20 dB. Readily achieved bandpass filter Q's of 5 to 20 make the phase angle balancing loop stable with this range of gain. Higher loop gains may cause miscommutation during system transients unless the Q value is higher which requires a premium grade filter.

An additional benefit of the phase angle balancing circuit 10 being added to a conventional VSCF system is that not only does it substantially reduce phase imbalance caused by unequal loads, but it also substantially reduces phase imbalances caused by out of tolerance components in the VSCF system itself. Thus, the phase angle balancing circuit 10 of the present invention allows use of lower tolerance components in the VSCF power system for phase balance specifications.

It should be noted that the phase angle balancing system of the present invention must be used in conjunction with the three phase voltage regulators of a conventional VSCF system if the voltage amplitudes of the phase 1, 2 and 3 power signals are to be kept within the desired voltage amplitude limits. In other words, if the phase angle balancing circuit 10 is used in a conventional VSCF power system without the standard voltage regulators, proper phase balancing can be achieved, but the amplitudes of the phase 1, 2 and 3 power signals is changed substantially in the process.

It has also been found that an additional benefit can be achieved by the phse angle balancing circuit of the present invention if it produces, in addition to the zero sequence voltage signal, an n harmonic control voltage signal, wherein n is the number of phases of the electric power signals produced by the VSCF system. In the case of a three phase VSCF system, the n harmonic would be the third harmonic because phase 1, 2 and 3 power signals are being produced. The third harmonic component of a three phase system is known to be zero sequence signals since it can be shown that these harmonic components of all three phase with each other.

In order to produce the additional third harmonic sequence control voltage in the embodiment of the phase angle balancing circuit as shown in FIG. 2, an additional active passband circuit having a passband centered on the third harmonic of the preselected frequency must be added between node 22 and the output of operational amplifier 34.

The third harmonic zero sequence feedback loop can substantially reduce the third harmonic component in the system output. The third harmonic is normally one of the largest distortion components in the system output wave.

What is claimed is:

1. A cycloconverter of the type having a source of multiphase electric power, a plurality of cycloconverter power source means connected to such multiphase electric power, each said cycloconverter power source means responsive to a gating signal for providing one of a plurality of alternating current power signals, of a preselected frequency, first means responsive to each of said alternating current power signals for providing a plurality of reference signals of said preselected frequency having voltage amplitudes controlled in accordance with voltage levels of said alternating current power signals, a plurality of gating signal means, each of said gating signal means having an input responsive to one of said reference signals for providing said gating signal to one of said cycloconverter power source means, the improvement comprising:

second means responsive to each of said alternating current power signals for summing said alternating current power signals so as to produce a zero sequence voltage signal, for inverting said zero sequence voltage signal, for providing said inverted zero sequence voltage signal to the input of said gating signal means.

2. The cycloconverter as defined in claim 1 wherein said second means further includes a bandpass filter means having a bandpass frequency response substantially centered at said preselected frequency for filtering out frequency components in said alternating current power signals outside said bandpass frequency response.

3. The cycloconverter as defined in claim 2 wherein said bandpass filter means is an active filter.

4. The cycloconverter as defined in claim 2 wherein said bandpass filter has a quality factor Q in the range of 5 to 20, for producing a bandpass filter such that the response time of the phase angle balance loop is stabilized.

5. The cycloconverter as defined in claim 3 wherein said bandpass filter has a quality factor Q in the range of 5 to 20.

6. The cycloconverter as defined in claim 3 wherein said active filter exhibits a voltage gain in the range of 3 to 10 dB.

7. The cycloconverter as defined in claim 1, wherein said preselected frequency is approximately 400 Hz.

8. The cycloconverter as defined in claim 1, wherein said bandpass filter means further includes a second bandpass response substantially centered at said third harmonic of said preselected frequency for filtering out frequency components in said alternating current power signals outside said bandpass frequency response.

9. The cycloconverter as defined in claim 1, further comprising a plurality of feedback means, each said feedback means responsive to one of said alternating current power signals for providing frequency components of said alternating current power signal above said preselected frequency to the input of one of said gating signal means.

10. The cycloconverter as defined in claim 2, further comprising a plurality of feedback means, each said feedback means responsive to one of said alternating current power signals for providing frequency components with said alternating current power signal above said preselected frequency to the input of one of said gating signal means.

11. In frequency converter for converting the frequency of a power source to a selected power output of the type having a plurality of output phases, each output phase having:

summation means having input terminals and an output terminal, constant frequency reference voltage means in timed phased relationship to all other sources of constant frequency reference connected to one of said summation means input terminals, modulator means connected to said summation means output and to said power source for providing a converter control signal, and having an output, a cycloconverter power circuit connected to said power source and to said modulator and having an output which is of the same frequency and substantially the same phase as said constant frequency reference voltage, a voltage regulator connected to said cycloconverter output and to said constant frequency reference voltage means for regulating the magnitude of said reference voltage, the improvement comprising: a phase angle correction means having inputs responsive to each cycloconverter output of each phase, and a summation means for producing a zero sequence voltage which is the sum of said input, and having an output, and means for connecting said phase angle correction means to an input of each of said summation means.

12. A cycloconverter of claim 11 wherein said phase angle correction means is connected to one of said summation means inputs in a negative feedback relationship.

13. The frequency converter of claim 11 wherein said phase angle correction means includes a bandpass filter which is substantially centered at the frequency of said constant frequency reference.

14. The frequency converter of claim 11 wherein said phase angle correction means includes a bandpass filter substantially centered at a frequency which is equal to the number of output phases times the constant frequency reference frequency.

15. The frequency converter of claim 13 or 14 wherein said filter is an active filter including a linear amplifier.

16. The frequency converter of claim 13 or 14, wherein said filter means includes an inversion means.

17. The frequency converter of claim 13 or 14, wherein said filter has a quality factor between 5 and 20.

* * * * *